Figure 1:
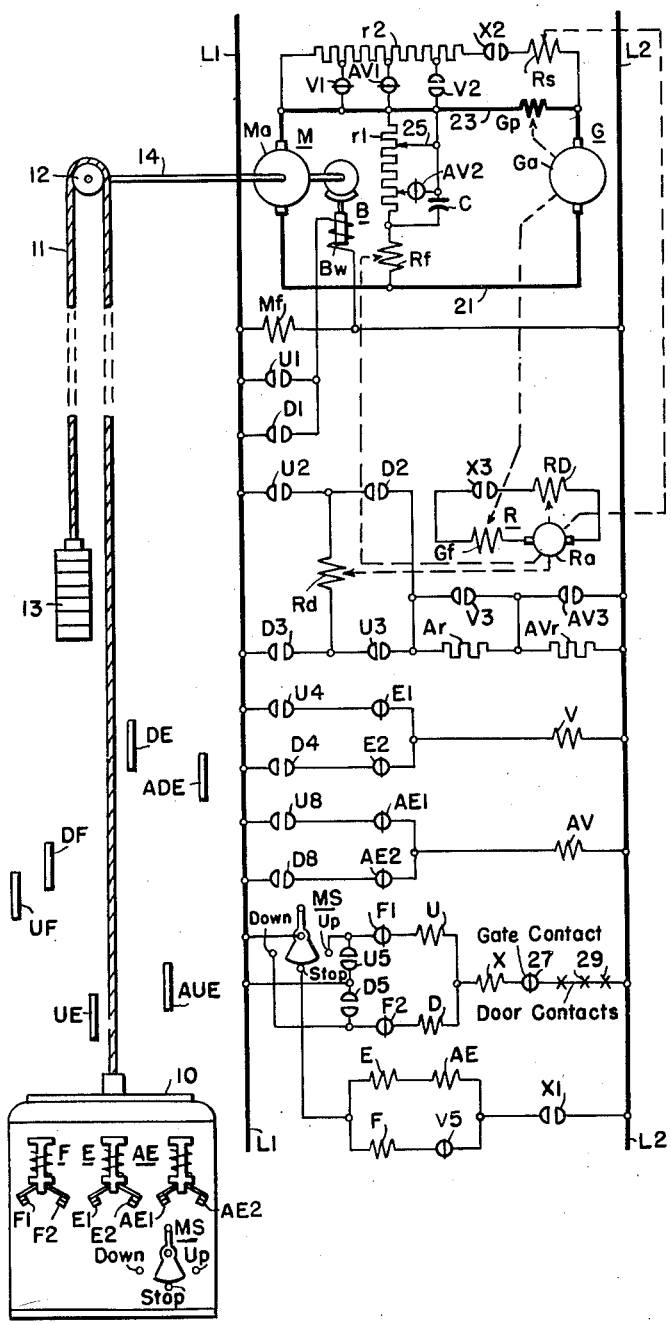

INVENTORS
Phillip C. Keiper
and William M. Ostrander.
ATTORNEY

Patented Feb. 2, 1954

2,668,265

UNITED STATES PATENT OFFICE 2,668,265

DIRECT-CURRENT MOTOR CONTROL SYSTEM

Phillip C. Keiper, Shrewsbury, and William M. Ostrander, Hackensack, N. J., assignors to Westinghouse Electric Corporation, East Pittsburgh, Pa., a corporation of Pennsylvania Application November 6, 1952, Serial No. 319,114

22 Claims. (Cl. 318—143)

1

This invention relates to motor control systems and it has particular relation to variable-voltage motor control systems incorporating regulator generators.

The use of regulator generators in variable-voltage motor control systems is well known in the art. Examples of such regulator generators will be found in the Santini et al. Patent 2,094,377, issued September 28, 1937, the Williams et al. Patent 2,238,614, issued April 15, 1941, and the Esselman Patent 2,528,126, issued October 31, 1950. Although aspects of the invention are useful in various systems employing regulator generators, the invention is particularly desirable for systems of the type shown in the aforesaid Williams et al. patent and in Fig. 5 of the aforesaid Esselman patent. For this reason the invention will be described with particular reference to the latter systems.

The invention may be incorporated in variable-voltage motor control systems employed for various purposes. However, it is particularly desirable for systems employed in operating elevator cars and will be discussed with particular reference to elevator systems.

In a variable-voltage system, a direct-current motor has its armature connected in a loop circuit with the armature of a main direct-current generator. The main field winding of the generator is excited in accordance with the armature current of a regulator generator which may have a pattern field winding and a differential field winding. The pattern field winding is energized from an adjustable source of direct current with a polarity selected in accordance with the desired direction of rotation of the motor. The differential field winding is energized substantially in accordance with the actual speed of the motor and acts in opposition to the pattern field winding. Consequently, the regulator generator is excited in accordance with the difference between the excitations of the pattern and differential field windings. One or more additional field windings may be employed for the purpose of improving the performance of the regulator generator. For example, a regulator generator series field winding may be energized substantially in accordance with current flowing in the aforesaid loop circuit and may provide an excitation aiding the excitation provided by the pattern field winding.

In accordance with the invention, the parameters of the system are varied during slow-down of the aforesaid motor. If the motor is operating at its full speed, and is to be stopped, the excitation of the pattern field winding is reduced. Some improvement in performance may be attained by reducing the excitation of the regulator generator series field windings substantially at this time. As the motor or the elevator car operated by the motor nears its stopping point, energization of one or more of the regulator generator fields is varied. In a preferred embodiment of the invention, the excitation of the differential field winding is increased as the elevator car nears its stopping point. Further improvement in the operation of the system may be obtained by increasing the excitation of the regulator generator series field winding substantially at this time. In this manner, the speed of the motor and of the elevator car driven thereby is smoothly reduced to a suitable low value from which the elevator car and motor may be brought to a complete stop by application of a suitable brake.

It is therefore an object of the invention to provide an improved direct-current motor control system employing a main generator having a field winding excited from a regulator generator wherein the excitation of the regulator generator is varied during a reduction in the voltage output of the main generator.

It is a second object of the invention to provide a direct-current motor control system employing a direct-current motor energized from a main generator wherein the excitation of the main generator is supplied from the armature of a regulator generator having a first regulator generator field winding energized from an adjustable source of direct current and a second regulator generator field winding excited substantially in accordance with the speed of the motor, the excitation supplied by the two regulator generator field windings being opposed to each other and wherein during a slow-down operation of the motor the excitation of the second regulator generator field winding is increased.

It is a third object of the invention to provide a motor control system as defined in the preceding paragraph wherein the regulator generator is provided with a third regulator generator field winding which is energized substantially in accordance with current supplied to the motor armature and wherein the excitation supplied by the third regulator generator field winding is increased during a slow-down operation of the motor.

It is a fourth object of the invention to provide a motor control system as defined in the preceding paragraph wherein during a slowdown operation of the motor the energization of the third regulator generator field winding is first decreased and subsequently increased.

It is a fifth object of the invention to provide an elevator system employing a motor control system as defined in any of the preceding four paragraphs for controlling the movement of an elevator car.

Figure 1A:
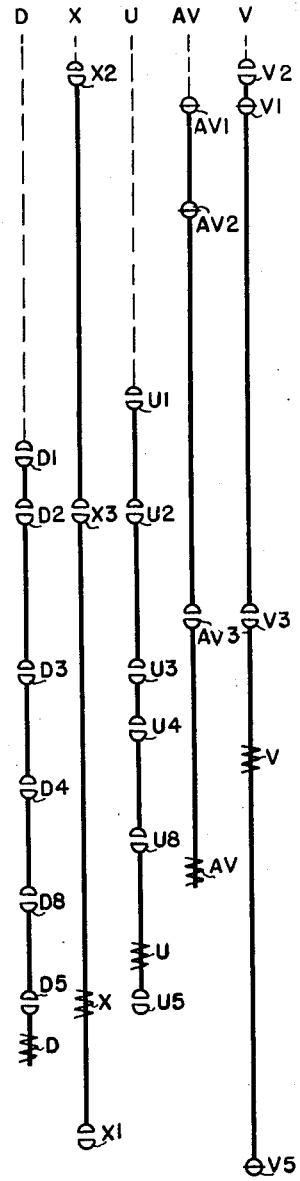

Other objects of the invention will be apparent from the following description taken in conjunction with the accompanying drawing in which Figure 1 is a schematic view with parts shown in elevation and parts shown in perspective of an elevator system embodying the invention; and Fig. 1A is a key representation of electromagnetic switches and relays employed in the system of Fig. 1. By inspection of Figs. 1 and 1A it will be observed that corresponding contact members and coils of the switches and relays in the two figures are substantially in horizontal alignment.

The various components in the drawing are illustrated in their deenergized conditions. A switch or relay may have make or front contact members which are open when the switch or relay is deenergized and dropped out, and which are closed when the switch or relay is energized and picked up. A switch or relay may have break or back contact members which are closed when the switch or relay is deenergized and dropped out and which are open when the switch or relay is energized and picked up. Each switch or relay is designated by a suitable reference character. Each set of contact members for a switch or relay is designated by the reference characters for the switch or relay followed by a numeral specific to such set of contact members. For example, the reference characters V1 and V5 designate respectively a specific set of make contact members and a specific set of break contact members for the speed relay V.

Referring to Fig. 1, an elevator system is disclosed which incorporates a variable-voltage motor control. In order to simplify the presentation of the invention, the system of Fig. 1 has been based in part on Fig. 5 of the aforesaid Santini et al. patent. The following components, illustrated in Fig. 1, also are disclosed in the Santini et al. patent and are identified by the same reference characters:

Elevator car 10
Cable 11
Sheave 12
Counterweights 13
Shaft 14
Inductor relay E (contact members E1, E2)
Landing inductor relay F (contact members F1, F2)
Inductor plates UE, DE
Master switch MS
Motor M (armature Ma, main field winding Mf)
Energized conductors L1, L2
Brake B
Brake releasing winding Bw
Generator G (armature Ga, main field winding Gf)
Regulator generator R (armature Ra, field winding Rf, field winding Rd, field winding Rs)
Up switch U (contact members U1 to U5)
Down switch D (contact members D1 to D5)
Auxiliary switch X (contact members X1)
Speed relay V (contact member V5)

Since the foregoing components are fully disclosed in the Santini et al. patent and operate in the same general manner, a detailed discussion thereof is here unnecessary. As pointed out below, certain of the relays may have additional contacts. In the patent the winding Rf and Rd are referred to as shunt and differential field windings respectively. In current practice it is more common to refer to the winding Rf as a differential field winding and to refer to the winding Rd as a pattern field winding. Certain additional components have been added to the system of Fig. 1 and these now will be discussed.

An auxiliary inductor relay AE is provided on the elevator car 10 for the purpose of providing an additional slowdown point for the elevator car. This inductor relay cooperates with an up inductor plates AUE and a down inductor plate ADE positioned in the elevator hoistway for each of the floors at which the elevator car is to make a stop when travelling in the up direction and in the down direction respectively. The inductor relay AE and its associated inductor plates are similar in construction to the inductor relay E and the associated inductor plates UE and DE.

If the elevator car is travelling in an up direction and is to stop at a floor, it will be observed that the inductor relay E first reaches the inductor plate UE of the desired floor to initiate a slowdown of the elevator car. Subsequently the inductor relay AE reaches the inductor plate AUE of the floor to further decrease the speed of the elevator car. Finally the landing inductor relay F reaches the inductor plate UF for the purpose of bringing the elevator car to a stop.

If the elevator car is travelling in a down direction and is to stop at a floor, the inductor relays E, AE and F successively reach the inductor plates DE, ADE and DF for the purpose of decreasing the speed of the elevator car and stopping the elevator car at a desired floor.

The auxiliary inductor relay AE has contact members AE1 and AE2 which are associated with an auxiliary speed relay AV. Additional contact members U8 and D8 are provided on the up switch U and the down switch D for further controlling the energization of the auxiliary speed relay AV. It will be observed that the contact members U8, AE1, D8 and AE2 are associated with the auxiliary speed relay AV in the same manner by which the contact members U4, E1, D4 and E2 are associated with speed relay V. The coil of the relay AE is connected in series with the coil of the inductor relay E for simultaneous energization therewith.

In Fig. 1 the armature Ma of the motor M and the armature Ga of the generator G are connected in a local loop circuit by conductors 21 and 23. If the generator has interpole field windings, such windings Gp may be included in the conductor 23.

The field winding Mf of the motor M is connected across the source of direct-current energization represented by the conductors L1 and L2. The main field winding Gf of the generator G is connected for energization in accordance with the current flowing in the armature Ra of a regulator generator R. It will be understood that the armatures of the generators G and R are rotated at suitable constant speeds by suitable motors (not shown).

Excitation for the armature of the direct-current regulator generator R is supplied in part by a pattern field winding Rd which is connected for energization across the conductors L1 and L2 through a suitable reversing switch. The reversing switch conveniently is constructed from contact members of the up switch U and the down switch D. When the make contact members U2 and U3 are closed, the pattern field winding Rd is connected across the conductors L1 and L2 with proper polarity to produce up travel of the associated elevator car. When the make contact members D2 and D3 of the down switch D are closed, the pattern field winding Rd is connected across the conductors L1 and L2 for energization with proper polarity to produce down-travel of the elevator car.

By inspection of Fig. 1, it will be observed that the energization of the pattern field winding may be completed through resistors Ar and AVr which are connected in series with the pattern field winding across the conductors L1 and L2. The resistors Ar and AVr may be shunted respectively by make contact members V3 of the speed relay V and AV3 of the auxiliary speed relay AV.

Excitation of the regulator generator R further is controlled by a differential field winding Rf which is connected through an adjustable resistor r1 across the armature Ma of the motor M for energization substantially in accordance with the actual speed of the motor M. The effective portion of the resistor r1 may be adjusted by means of a suitable adjustable tap 25.

It will be understood that the excitation supplied by the differential field winding Rf acts in opposition to the excitation supplied to the regulator generator by the pattern field winding Rd. Consequently, the differential field winding tends to maintain the motor M at a speed determined by the energization of the pattern field winding.

Under certain conditions, it is desirable to change the energization of the differential field winding Rf. For example, improved performance is obtained by increasing the energization of the differential field winding above the values which it otherwise would have during the later stages of a slow-down operation of the motor. Such a change is effected by break contacts AV2 of the auxiliary speed relay AV. When these contacts close, they shunt a substantial portion of the resistor r1 and thereby increase the energization of the differential field winding above the values which it otherwise would have.

Further improvement in the operation of the system is provided by the inclusion in the system of one or more additional regulator generator field windings. Thus, a regulator generator series field winding Rs is energized substantially in accordance with current supplied to the motor M for the purpose of aiding the pattern field winding Rd. To this end, the regulator generator series field winding Rs may be connected through make contacts X2 of the auxiliary switch X and an adjustable resistor r2 across the interpole field windings Gp.

Inasmuch as the motor M has some resistance, it follows that a voltage drop is produced across this resistance which varies in accordance with the current supplied to the motor. The regulator generator series field winding Rs may be proportioned to excite the regulator generator in order to compensate for the voltage drop introduced by the resistance of the motor M or by the entire loop circuit if so desired.

Although a fixed proportion of the loop circuit current may be diverted through the regulator generator series field winding Rs, it has been found desirable under certain conditions to vary this proportion. Such variation is introduced by break contact members V1 and make contact members V2 of the speed relay and by break contact members AV1 of the auxiliary speed relay AV. These contact members shunt different portions of the resistor r2.

The armature of the regulator generator R is connected across the main field winding Gf of the generator G through the make contacts X3. Inasmuch as this circuit has resistance, a resistance voltage drop is present which varies as a function of the current supplied by the armature Ra. In order to compensate for this voltage drop, a self-excited field winding RD is included in the circuit and is poled to aid the pattern field winding Rd. The excitation supplied by the self-excited field winding RD may be proportioned to compensate for the voltage drop due to the resistance of the associated circuit.

The operation of the entire system now will be set forth. It will be assumed initially that the elevator car 10 is at rest and that the elevator car is to be moved in an up direction. The elevator car attendant operates the master switch MS in a counterclockwise direction as viewed in Fig. 1 to establish an energizing circuit for the up switch U and the auxiliary switch X. This circuit is completed through the break contacts F1 of the landing inductor relay F and through certain interlocking gate contacts 27 and door contacts 29. It will be understood that in the conventional elevator system, a gate is provided on the elevator car and a hoistway door is provided at each of the hoistway landings to control the space through which passengers enter and leave the elevator car. The gate contacts 27 are closed only when the elevator car gate is closed. Each set of door contacts 29 is associated with a separate one of the hoistway doors and is closed only when the associated hoistway door is closed. Under the assumed conditions, the gate and doors are all closed to permit energization of the switches U and X.

In response to its energization, the up switch U closes its make contacts U1 to energize the brake releasing winding Bw. It will be understood that in accordance with conventional practice, the brake B is biased into braking condition by means of spring means (not shown).

The make contact members U2 and U3 close to connect the pattern field winding Rd in series with the resistors Ar and AVr across the conductors L1 and L2 for energization with proper polarity for up travel of the elevator car 10.

Closure of the make contact members U4 completes through the closed break contacts E1 of the inductor relay E an energizing circuit for the speed relay V. Closure of the make contacts U8 completes through the closed break contacts AE1 of the auxiliary inductor relay AE an energizing circuit for the auxiliary speed relay AV. The up switch also closes its make contact members U5 to establish a holding circuit around the master switch MS.

Inasmuch as the auxiliary switch X also is energized, it follows that make contact members X1 close to prepare the coils of the inductor relays for subsequent energization. Make contacts X2 additionally provided for the auxiliary switch close to condition the regulator generator series field winding Rs for energization. Finally, make contact members X3 also operated by the auxiliary switch close to complete a series circuit for the main field winding Gf of the generator G, the armature Ra of the regulator generator and the self-excited field winding RD of the regulator generator.

Returning to the speed relay V which now is energized, it will be noted that this relay opens its break contact members V1 and closes its make contact members V2 to shunt a substantial portion of the resistor r2. This permits substantial energization of the regulator generator series field winding Rs as the voltage output of the generator G builds up.

The speed relay V additionally closes its make contacts V3 to shunt the resistor Ar. Finally, the speed relay opens its break contacts V5 to prevent energization therethrough of the landing inductor relay F.

The auxiliary speed relay AV also is energized at this time and opens its break contacts AV1 without immediately affecting the system operation. In addition, the relay opens its break contact members AV2, to introduce a substantial portion of the resistor r1 in series with the regulator generator differential field winding Rf. The auxiliary speed relay also closes its make contact members AV3 to shunt the resistor AVr.

The pattern field winding Rd now is connected directly across the conductors L1 and L2 and receives its maximum energization. As a result, the regulator generator armature Ra rapidly builds up a voltage to energize the main field winding Gf of the generator G. As the voltage of the armature Ra builds up, the self-excited field winding RD increasingly aids the pattern field winding Ra to excite the regulator generator for the purpose of compensating for the resistance drop in the circuit associated with the armature Ra.

In view of the fact that the main field winding Gf of the generator G rapidly builds up, the voltage across the armature Ga of the generator also builds up rapidly and supplies current to the armature Ma of the motor M. The motor accelerates the elevator car 10 in the up direction.

At the same time, a substantial portion of the loop circuit current flows through the regulator generator series field winding Rs. This field winding increases the output of the armature Ra of the regulator generator sufficiently to compensate for the resistance drop produced by current supplied to the motor M.

As the speed of the motor M increases, the voltage across its terminals increases. Inasmuch as this voltage is applied across the differential field winding Rf and the effective portion of the resistor r1, the differential field winding is energized substantially in accordance with the speed of the motor M. The energized field winding produces an excitation for the regulator generator which opposes the excitation supplied by the pattern field winding Rd. The motor M accelerates until a predetermined relationship exists between the excitation supplied by the field windings Rf and Rd. The speed of the motor M thereafter is maintained substantially constant.

Next, it will be assumed that the elevator car 10 is approaching a floor at which it is to stop. Before the elevator car reaches the inductor plates associated with such floor, the elevator car attendant centers his master switch MS to complete through the center contact of the master switch and the closed contact members X1 an energizing circuit for the coils of the inductor relays E and AE. When the elevator car 10 thereafter reaches a point such that the inductor relay E is alongside the inductor plate UE for the floor at which the elevator car is to stop, a magnetic circuit is completed which results in opening of the contact members E1. The inductor relays may be of the conventional type. Such a relay may pick up only if its coil is energized and if it is aligned with an associated inductor plate. When once picked up the relay may remain picked up until its coil is deenergized even though it leaves the inductor plate responsible for such pick up. The opening of the contact members E1 results in deenergization of the speed relay V.

The speed relay V opens its make contacts V3 to introduce the resistor Ar in series with the pattern field winding Rd. As a result of the decrease in the energization of the pattern field winding, the output of the generator G decreases and the motor M decelerates towards a slow speed which is determined by the energization of the pattern field winding. Increased smoothness in deceleration during this period is obtained as a result of the opening of the make contact members V2 and closure of the break contact members V1. This increases the proportion of the resistor r2 which is connected in series with the regulator generator series field winding Rs.

The speed relay additionally closes its break contacts V5 to complete with the contacts X1 and the master switch MS an energizing circuit for the coil of the landing inductor relay F.

The elevator car 10 continues its upward motion but at reduced speed until the inductor relay AE is alongside the inductor plate AUE for the floor at which the elevator car is to stop. The inductor plate completes a magnetic circuit for the relay which results in opening of the contact members AE1. The opening of these contact members deenergizes the auxiliary relay AV. As a result of its deenergization, the auxiliary speed relay closes its break contact members AV2 to decrease the proportion of the resistor r1 which is connected in series with the regulator generator differential field winding Rf. The resulting increase in the energization of the differential field winding above that which otherwise would be obtained has been found to improve the slow-down operation of the elevator car.

The theory explaining the improvement in operation of the system as a result of the increase in energization of the differential field winding may be set forth as follows: The generator G is of conventional construction including armature windings and field windings associated with an iron magnetic circuit. Because of the residual magnetism of the magnetic circuit associated with the armature and field windings of the generator, it is difficult to reduce the speed of the elevator car 10 to a value low enough to prevent application of the brake B from jarring the elevator car and its passengers. By strengthening the differential field during the later portion of the slow-down period, it is possible to decrease the speed of the elevator car smoothly to a suitable low value.

It is possible to obtain the desired ultimate low speed by increasing the energization of the differential field winding at the beginning of the slow-down period. For example, let it be assumed that the break contact members AV2 are replaced by break contact members operated by the speed relay V. Under such conditions, the increase in the energization of the differential field winding would be effective throughout the slow-down period. However, this sacrifices smoothness of slow-down during the initial portion of the slow-down period.

Further improvement in the slow-down characteristics is obtained by variation in the energization of the regulator generator series field winding Rs. It will be noted that when deenergized, the auxiliary speed relay AV closes its break contact members AV1 to decrease the proportion of the resistor r2 which is connected in series with the regulator generator series field winding Rs. The resulting increase in energization of the regulator generator series field winding assists in providing smooth slow-down of the elevator car to a low landing speed.

The increase in energization of the regulator generator series field winding may be effected at the beginning of the slow-down period. For example, the break contact members AV1 may be replaced by the break contact members V1. However, this again would sacrifice smoothness of slow-down during the initial part of the slow-down period.

As the elevator car 10 continues its approach, at still further reduced speed towards the floor at which it is to stop, landing inductor relay F finally comes alongside the inductor plate UF for such floor. The inductor plate completes a magnetic circuit for the relay which results in opening of the contacts F1. These contacts in opening deenergize the up switch U and the auxiliary switch X.

Deenergization of the up switch U results in opening of the make contact members U1 to permit reapplication of the spring-applied brake B. Contact members U2 and U3 open to deenergize the pattern field winding Rd. The elevator car 10 now stops accurately at the desired floor.

Opening of the make contact members U4, U8 and U5 has no immediate effect on the operation of the system.

When deenergized, the auxiliary switch X opens its make contact members X1 to deenergize the coils of the inductor relays. Opening of the make contact members X2 and X3 has no immediate effect on the operation of the system.

As the elevator car 10 stops, the inductor relays pass slightly out of effective alignment with their associated inductor plates. At the same time, the opening of the make contact members X1 deenergizes the inductor relay coils. Consequently, the break contact members AE1 and F1 reclose to condition the system for subsequent operation.

Further improvement in the operation of the system may be effected by connecting one or more capacitors C across all or part of the resistor r1, during all or part of the slow-down period. As shown in Fig. 1, the capacitor C is connected across the effective portion of the resistor r1. The use of capacitors in this manner is set forth in the aforesaid Esselman patent.

To illustrate the benefits derived from the invention, reference may be made to a typical installation. In such an installation, the auxiliary speed relay AV may drop out four inches from a floor at which the elevator car is to stop. In the absence of the invention, it has been found difficult to obtain a landing speed for the elevator car below approximately 12 feet per minute. Consequently when the brake B was applied, a substantial shock was produced. By adding the adjustments for the differential and series field windings, as above set forth, it was found entirely practical to reduce the landing speed to a lower value such as 6 to 8 feet per minute. From such a speed, the elevator brake B is capable of bringing the elevator car to a stop at the desired floor smoothly and without shock.

If the elevator car is to be moved in a down direction, the master switch MS is rotated in a clockwise direction as viewed in Fig. 1 to energize the down switch D and the auxiliary switch X. If the interlocking door and gate contacts are closed, these switches D and X are energized to prepare the elevator car for down operation. The contacts X1 close to prepare the inductor relay windings for subsequent energization. Contacts X2 close to complete an energizing circuit for the regulator generator series field winding. Contacts X3 close to connect the field windings Gf and RD across the armature Ra of the regulator generator.

The contact members D1 close to energize the brake winding Bw and release the brake B. Also the contact members D2 and D3 close to connect the pattern field winding Rd to the buses L1 and L2 with proper polarity for down travel of the elevator car. The contacts D4 and D8 close to energize respectively the associated relays V and AV. These relays close their contacts V3 and AV3 to shunt the resistors Ar and AVr. In addition, the speed relays open their break contacts V1 and AV1 and close the make contacts V2 to connect the regulator generator series field winding for full-speed operation. Break contacts AV2 open to condition the differential field winding Rf for full-speed operation. Finally, break contacts V5 open to prevent energization therethrough of the coil of the landing inductor relay F.

The elevator car 10 now accelerates to its rated speed in the down direction. If the elevator car attendant desires to stop the elevator car at a floor, he centers his master switch MS immediately before the car reaches the inductor plates for the desired floor. As the elevator car continues its travel, the inductor relay E comes alongside the inductor plate DE for the desired floor and opens its break contact E2 to deenergize the speed relay V. This relay operates in the manner previously described to initiate a slow-down operation of the elevator car.

As the elevator car continues its motion at reduced speed, the inductor relay AE comes alongside the inductor plate ADE for the desired floor and opens its break contacts AE2 to deenergize the auxiliary speed relay AV. The deenergization of the auxiliary speed relay operates in the manner previously described to reduce the speed of the elevator car to a low landing value.

Continued motion of the elevator car brings the landing inductor relay F alongside the inductor plate DF for the desired floor. This results in opening of the break contacts F2 to deenergize the down switch D and the auxiliary switch X. The down switch D, as a result of its deenergization, opens its make contacts D1 to deenergize the brake release winding Bw and thus permits reapplication of the spring-applied brake. Contacts D2 and D3 open to deenergize the pattern field winding Rd and the elevator car stops accurately at the desired floor. Opening of the make contacts D4, D8 and D5 has no immediate effect on the operation of the system.

As a result of its deenergization, the auxiliary switch X opens its make contacts X1 to deenergize the coils of the inductor relays. In addition, as the elevator car stops at the desired floor, the inductor relays pass slightly beyond the influence of their associated inductor plates. Consequently the contacts of the inductor relays are reset. The deenergized auxiliary switch X also opens its make contacts X2 and X3 without affecting immediately the operation of the system.

Although the invention has been described with reference to certain specific embodiments thereof, numerous modifications falling within the spirit and scope of the invention are possible.

We claim as our invention:

1. In a direct-current motor control system; a generator having a generator armature and generator field-excitation means, an auxiliary dynamo-electric machine having an armature connected to energize said generator field-excitation means, said dynamo-electric machine having first field-excitation means effective for producing a first excitation of the dynamo-electric machine acting when energized to provide a first excitation of the generator field-excitation means and having a second field-excitation means effective for producing a second excitation acting when energized to oppose the excitation of the generator field-excitation means produced by the first field-excitation means, means operable for decreasing the output of the generator, and means effective after said output of the generator has decreased substantially from a predetermined value for increasing the excitation of the second field-excitation means.

2. In a direct-current motor control system, a generator having a generator armature and generator field excitation means, a direct-current motor having an armature connected in a local circuit with the generator armature, an auxiliary dynamo-electric machine having an armature connected to energize said generator field-excitation means, said dynamo-electric machine having first field-excitation means effective for producing a first excitation of the dynamo-electric machine acting when energized to provide a first excitation of the generator field-excitation means and having a second field-excitation means connected for energization substantially in accordance with the actual speed of the motor for producing a second excitation acting to oppose the excitation of the generator field excitation means produced by the first field-excitation means, means for energizing the first field-excitation means in accordance with a desired speed of said motor, means for initiating a slow-down of said motor, and means effective substantially after said initiation, but substantially before stopping of said motor for increasing the energization of said second field-excitation means.

3. In a direct-current motor control system, a generator having a generator armature and generator field-excitation means, a direct-current motor having an armature connected in a local circuit with the generator armature, an auxiliary dynamo-electric machine having an armature connected to energize said generator field-excitation means, said dynamo-electric machine having first field-excitation means effective for producing a first excitation of the dynamo-electric machine acting when energized to produce a first excitation of the generator field excitation means and having a second field-excitation means connected for energization substantially in accordance with the actual speed of the motor for producing a second excitation acting to oppose the excitation of the generator field excitation means produced by the first field-excitation means, means for energizing the first field-excitation means in accordance with a desired speed of said motor, said dynamo-electric machine having third field-excitation means connected for energization substantially in accordance with current supplied to said motor armature and acting to aid the excitation of the generator field-excitation means produced by the first field-excitation means, means for initiating a slow-down of said motor, and means effective substantially after said initiation, but substantially before stopping of said motor for increasing the energization of said second field-excitation means, and for increasing the energization of the third field-excitation means.

4. In a direct-current motor control system, a generator having a generator armature and generator field excitation means, a direct-current motor having an armature connected in a local circuit with the generator armature, an auxiliary dynamo-electric machine having an armature connected to energize said generator field-excitation means, said dynamo-electric machine having first field-excitation means effective for producing a first excitation of the dynamo-electric machine acting when energized to provide a first excitation of the generator field-excitation means and having a second field-excitation means connected for energization substantially in accordance with the actual speed of the motor for producing a second excitation acting to oppose the excitation of the generator field excitation means produced by the first field-excitation means, means for energizing the first field-excitation means in accordance with a desired speed of said motor, said dynamo-electric machine having third field-excitation means connected for energization substantially in accordance with current supplied to said motor armature and acting to aid the excitation of the generator field-excitation means produced by the first field-excitation means, means for initiating a slow-down of said motor and a decrease in energization of the third field-excitation means, and means effective substantially after said initiation, but substantially before stopping of said motor for increasing the energization of said second field-excitation means.

5. In a direct-current motor control system, a generator having a generator armature and generator field-excitation means, a direct-current motor having an armature connected in a local circuit with the generator armature, an auxiliary dynamo-electric machine having an armature connected to energize said generator field-excitation means, said dynamo-electric machine having first field-excitation means effective for producing a first excitation of the dynamo-electric machine acting when energized to provide a first excitation of the generator field excitation means and having a second field-excitation means connected for energization substantially in accordance with the actual speed of the motor for producing a second excitation acting to oppose the excitation of the generator field-excitation means produced by the first field-excitation means, means for energizing the first field-excitation means in accordance with a desired speed of said motor, said dynamo-electric machine having third field-excitation means connected for energization substantially in accordance with current supplied to said motor armature and acting to aid the excitation of the generator field-excitation means produced by the first field-excitation means, means for initiating a decrease in energization of the first and third field-excitation means to initiate a decrease in the motor speed, and means effective substantially after said initiation, but substantially before stopping of said motor for increasing the energization of said second field-excitation means, and for increasing the energization of the third field-excitation means.

6. In a direct-current motor control system, a generator having a generator armature and generator field-excitation means, an auxiliary dynamo-electric machine having an armature connected to energize said generator field-excitation means, said dynamo-electric machine having first field-excitation means effective for producing a first excitation of the dynamo-electric machine acting when energized to provide a first excitation of the generator field-excitation means and having a second field-excitation means effective for producing a second excitation acting when energized to oppose the excitation of the generator field-excitation means produced by the first field-excitation means, means operable for decreasing the output of the generator, and means effective after said output of the generator has decreased substantially from a predetermined value for increasing the excitation of the second field-excitation means and decreasing the excitation of the first field-excitation means.

7. In a direct-current motor control system, a generator having a generator armature and generator field-excitation means, a direct-current motor having an armature connected in a local circuit with the generator armature, an auxiliary dynamo-electric machine having an armature connected to energize said generator field-excitation means, said dynamo-electric machine having first field-excitation means effective for producing a first excitation of the dynamo-electric machine acting when energized to excite the generator field-excitation means and having a second field-excitation means connected for energization substantially in accordance with the actual speed of the motor for producing a second excitation acting to oppose the excitation of the generator field-excitation means by the first field-excitation means, means for energizing the first field-excitation means in accordance with a desired speed of said motor, means for initiating a slow-down of said motor, and means effective substantially after said initiation, but substantially before stopping of said motor for increasing the energization of said second field-excitation means and decreasing the excitation of the first field-excitation means.

8. In a variable-voltage control system, a direct-current main generator having a main generator armature and a main generator field winding, a direct-current motor having a motor armature, a direct-current regulator generator having a regulator generator armature and having first, second and third regulator generator field windings, a loop circuit connecting in series said main generator armature and the motor-armature, connections for energizing the main generator field winding in accordance with armature current of the regulator generator, connections for energizing the first regulator generator field winding substantially in accordance with current traversing the loop circuit, connections for energizing the second regulator generator field winding substantially in accordance with the voltage of the motor armature, connections for energizing the third regulator generator field winding substantially in accordance with a predetermined adjustable direct voltage having a predetermined polarity, said third regulator generator field winding when energized being effective for applying to the main generator field winding through the regulating generator armature an energization acting to build up the voltage applied to the motor armature, said first regulator generator field winding when energized being effective for supplying excitation aiding the excitation supplied by the third regulator generator field winding and the second regulator generator field winding being effective when energized for supplying excitation opposing the excitation supplied by the third regulator generator field winding, a decrease in excitation supplied by the third regulator generator field winding being effective for slowing down the motor, and means effective a substantial time after initiation of slow-down of the motor by a change in excitation supplied by the third regulator generator field winding but before stopping of the motor for increasing the excitation supplied by one of the other regulator generator field windings.

9. In a variable-voltage control system, a direct-current main generator having a main generator armature and a main generator field winding, a direct-current motor having a motor armature, a direct-current regulator generator having a regulator generator armature and having first, second, third and fourth generator field windings, a loop circuit connecting in series said main generator armature and the motor-armature, connections for energizing the main generator field winding in accordance with armature current of the regulator generator, connections for energizing the first regulator generator field winding substantially in accordance with current traversing the loop circuit, connections for energizing the second regulator generator field winding substantially in accordance with the voltage of the motor armature, connections for energizing the third regulator generator field winding substantially in accordance with a predetermined adjustable direct voltage having a predetermined polarity, said third regulator generator field winding when energized being effective for applying to the main generator field winding through the regulating generator armature an energization acting to build up the voltage applied to the motor armature, connections for energizing the fourth regulator generator field winding substantially in accordance with the armature current of the regulator generator, said first regulator generator field winding when energized being effective for supplying excitation aiding the excitation supplied by the third regulator generator field winding and the second regulator generator field winding being effective when energized for supplying excitation opposing the excitation supplied by the third regulator generator field winding, a decrease in excitation supplied by the third regulator generator field winding being effective for slowing down the motor, and means effective a substantial time after initiation of slow-down of the motor by a change in excitation supplied by the third regulator generator field winding but before stopping of the motor for increasing the excitation supplied by the second regulator generator field winding.

10. In a variable-voltage control system, a direct-current main generator having a main generator armature and a main generator field winding, a direct-current motor having a motor armature, a direct-current regulator generator having a regulator generator armature and having first, second and third regulator generator field windings, a loop circuit connecting in series said main generator armature and the motor armature, connections for energizing the main generator field winding in accordance with armature current of the regulator generator, connections for energizing the first regulator generator field winding substantially in accordance with current traversing the loop circuit, connections for energizing the second regulator generator field winding substantially in accordance with the voltage of the motor armature, connections for energizing the third regulator generator field winding substantially in accordance with a predetermined adjustable direct voltage having a predetermined polarity, said third regulator generator field winding when energized being effective for applying to the main generator field winding through the regulating generator armature an energization acting to build up the voltage applied to the motor armature, said first regulator generator field winding when energized being effective for supplying excitation aiding the excitation supplied by the third regulator generator field winding and the second regulator generator field winding being effective when energized for supplying excitation opposing the excitation supplied by the third regulator generator field winding, a decrease in excitation supplied by the third regulator generator field winding being effective for slowing down the motor, and means effective a substantial time after initiation of slow-down of the motor by a change in excitation supplied by the third regulator generator field winding but before stopping of the motor for increasing the excitation supplied by both of the other regulator generator field windings.

11. In a variable-voltage control system, a direct-current main generator having a main generator armature and a main generator field winding, a direct-current motor having a motor armature, a direct-current regulator generator having a regulator generator armature and having first, second and third regulator generator field windings, a loop circuit connecting in series said main generator armature and the motor armature, connections for energizing the main generator field winding in accordance with armature current of the regulator generator, connections for energizing the first regulator generator field winding substantially in accordance with current traversing the loop circuit, connections for energizing the second regulator generator field winding substantially in accordance with the voltage of the motor armature, connections for energizing the third regulator generator field winding substantially in accordance with a predetermined adjustable direct voltage having a predetermined polarity, said third regulator generator field winding when energized being effective for applying to the main generator field winding through the regulating generator armature an energization acting to build up the voltage applied to the motor armature, said first regulator generator field winding when energized being effective for supplying excitation aiding the excitation supplied by the third regulator generator field winding and the second regulator generator field winding being effective when energized for supplying excitation opposing the excitation supplied by the third regulator generator field winding, a decrease in excitation supplied by the third regulator generator field winding being effective for slowing down the motor, means effective during the initial stage of slow-down of the motor for decreasing the excitation supplied by the first regulator generator field winding, and means effective a substantial time after such decrease in excitation supplied by the first regulator generator field winding, but before stopping of the motor for increasing the excitation supplied by one of the first and second regulator generator field windings.

12. In a variable-voltage control system, a direct-current main generator having a main generator armature and a main generator field winding, a direct-current motor having a motor armature, a direct-current regulator generator having a regulator generator armature and having first, second and third regulator generator field windings, a loop circuit connecting in series said main generator armature and the motor armature, connections for energizing the main generator field winding in accordance with armature current of the regulator generator, connections for energizing the first regulator generator field winding substantially in accordance with current traversing the loop circuit, connections for energizing the second regulator generator field winding substantially in accordance with the voltage of the motor armature, connections for energizing the third regulator generator field winding substantially in accordance with a predetermined adjustable direct voltage having a predetermined polarity, said third regulator generator field winding when energized being effective for applying to the main generator field winding through the regulating generator armature an energization acting to build up the voltage applied to the motor armature, said first regulator generator field winding when energized being effective for supplying excitation aiding the excitation supplied by the third regulator generator field winding and the second regulator generator field winding being effective when energized for supplying excitation opposing the excitation supplied by the third regulator generator field winding, a decrease in excitation supplied by the third regulator generator field winding being effective for slowing down the motor, means effective during the initial stage of slow-down of the motor for decreasing the excitation supplied by the first regulator generator field winding, and means effective a substantial time after such decrease in excitation supplied by the first regulator generator field winding, but before stopping of the motor for increasing the excitation supplied by the second regulator generator field windings.

13. In a variable-voltage control system, a direct-current main generator having a main generator armature and a main generator field winding, a direct-current motor having a motor armature, a direct-current regulator generator having a regulator generator armature and having first, second and third regulator generator field windings, a loop circuit connecting in series said main generator armature and the motor armature, connections for energizing the main generator field winding in accordance with armature current of the regulator generator, connections for energizing the first regulator generator field winding substantially in accordance with current traversing the loop circuit, connections for energizing the second regulator generator field winding substantially in accordance with the voltage of the motor armature, connections for energizing the third regulator generator field winding substantially in accordance with a predetermined adjustable direct voltage having a predetermined polarity, said third regulator generator field winding when energized being effective for applying to the main generator field winding through the regulating generator armature an energization acting to build up the voltage applied to the motor armature, said first regulator generator field winding when energized being effective for supplying excitation aiding the excitation supplied by the third regulator generator field winding and the second regulator generator field winding being effective when energized for supplying excitation opposing the excitation supplied by the third regulator generator field winding, a decrease in excitation supplied by the third regulator generator field winding being effective for slowing down the motor, and means effective a substantial time after initiation of slow-down of the motor by a change in excitation supplied by the third regulator generator field winding but before stopping of the motor for increasing the excitation supplied by one of the other regulator generator field windings, and for decreasing the excitation supplied by the third regulator generator field winding.

14. In a variable-voltage control system, a direct-current main generator having a main generator armature and a main generator field winding, a direct-current motor having a motor armature, a direct-current regulator generator having a regulator generator armature and having first, second and third regulator generator field windings, a loop circuit connecting in series said main generator armature and the motor armature, connections for energizing the main generator field winding in accordance with armature current of the regulator generator, connections for energizing the first regulator generator field winding substantially in accordance with current traversing the loop circuit, connections for energizing the second regulator generator field winding substantially in accordance with the voltage of the motor armature, connections for energizing the third regulator generator field winding substantially in accordance with a predetermined adjustable direct voltage having a predetermined polarity, said third regulator generator field winding when energized being effective for applying to the main generator field winding through the regulating generator armature an energization acting to build up the voltage applied to the motor armature, said first regulator generator field winding when energized being effective for supplying excitation aiding the excitation supplied by the third regulator generator field winding and the second regulator generator field winding being effective when energized for supplying excitation opposing the excitation supplied by the third regulator generator field winding, a decrease in excitation supplied by the third regulator generator field winding being effective for slowing down the motor, and means effective a substantial time after initiation of slow-down of the motor by a change in excitation supplied by the third regulator generator field winding but before stopping of the motor for increasing the excitation supplied by the second regulator generator field winding and decreasing the excitation supplied by the third regulator generator field winding.

15. In a variable-voltage control system, a direct-current main generator having a main generator armature and a main generator field winding, a direct-current motor having a motor armature, a direct-current regulator generator having a regulator generator armature and having fist, second and third regulator generator field windings, a loop circuit connecting in series said main generator armature and the motor armature, connections for energizing the main generator field winding in accordance with armature current of the regulator generator, connections for energizing the first regulator generator field winding substantially in accordance with current traversing the loop circuit, connections for energizing the second regulator generator field winding substantially in accordance with the voltage of the motor armature, connections for energizing the third regulator generator field winding substantially in accordance with a predetermined adjustable direct voltage having a predetermined polarity, said third regulator generator field winding when energized being effective for applying to the main generator field winding through the regulating generator armature an energization acting to build up the voltage applied to the motor armature, said first regulator generator field winding when energized being effective for supplying excitation aiding the excitation supplied by the third regulator generator field winding and the second regulator generator field winding being effective when energized for supplying excitation opposing the excitation supplied by the third regulator generator field winding, a decrease in excitation supplied by the third regulator generator field winding being effective for slowing down the motor, and means effective a substantial time after initiation of slow-down of the motor by a change in excitation supplied by the third regulator generator field winding but before stopping of the motor for increasing the excitation supplied by the first and second regulator generator field windings and decreasing the excitation supplied by the third regulator generator field winding.

16. In an elevator system, an elevator car, driving means including a direct-current motor having an armature for driving the elevator car, a direct-current main generator for supplying electrical energy to the motor, said generator having a main generator armature and a main generator field winding, a direct-current regulator generator having a regulator generator armature and first and second regulator generator field windings, a loop circuit connecting the main generator armature and the motor armature in series, connections for energizing the main generator field winding in accordance with the output of the regulator generator armature, connections for energizing the first regulator generator field winding substantially in accordance with a predetermined adjustable voltage having a predetermined polarity, means for energizing the second regulator generator field winding substantially in accordance with the actual speed of the motor with proper polarity to provide excitation acting in opposition to the excitation supplied by the first regulator generator field winding, means responsive to arrival of the elevator car at a slow-down point in its travel at which the car is to slow down for decreasing the energization of the first regulator generator field winding in order to slow down the elevator car as the car approaches a stopping point, and means effective when the elevator car reaches during slow-down a point intermediate the slow-down and stopping points for decreasing the excitation supplied by the first regulator generator field winding and for increasing the excitation supplied by the second regulator generator field winding.

17. In an elevator system, an elevator car, driving means including a direct-current motor having an armature for driving the elevator car, a direct-current main generator for supplying electrical energy to the motor, said generator having a main generator armature and a main generator field winding, a direct-current regulator generator having a regulator generator armature and first, second and third regulator generator field windings, a loop circuit connecting the main generator armature and the motor armature in series, connections for energizing the main generator field winding in accordance with the output of the regulator generator armature, connections for energizing the first regulator generator field winding substantially in accordance with a predetermined adjustable voltage having a predetermined polarity, means for energizing the second regulator generator field winding substantially in accordance with the armature voltage of the motor with proper polarity to provide excitation acting in opposition to the excitation supplied by the first regulator generator field winding, means for energizing the third regulator generator field winding substantially in accordance with current supplied to the motor armature with proper polarity to produce an excitation aiding the excitation supplied by the first regulator generator field winding to compensate substantially for voltage drops due to the resistance in the motor armature, means responsive to arrival of the elevator car at a slow-down point in its travel at which the car is to slow down for decreasing the energization of the first regulator generator field winding in order to slow down the elevator car as the car approaches a stopping point, and means effective when the elevator car reaches during slow-down a point intermediate the slow-down and stopping points for decreasing the excitation supplied by the first regulator generator field winding and for increasing the excitation supplied by the second regulator generator field winding.

18. In an elevator system, an elevator car, driving means including a direct-current motor having an armature for driving the elevator car, a direct-current main generator for supplying electrical energy to the motor, said generator having a main generator armature and a main generator field winding, a direct-current regulator generator having a regulator generator armature and first, second and third regulator generator field windings, a loop circuit connecting the main generator armature and the motor armature in series, connections for energizing the main generator field winding in accordance with the output of the regulator generator armature, connections for energizing the first regulator generator field winding substantially in accordance with a predetermined adjustable voltage having a predetermined polarity, means for energizing the second regulator generator field winding substantially in accordance with the armature voltage of the motor with proper polarity to provide excitation acting in opposition to the excitation supplied by the first regulator generator field winding, means for energizing the third regulator generator field winding substantially in accordance with current supplied to the motor armature with proper polarity to produce an excitation aiding the excitation supplied by the first regulator generator field winding to compensate substantially for voltage drops due to resistance of the motor armature, means responsive to arrival of the elevator car at a slow-down point in its travel at which the car is to slow down for decreasing the energization of the first regulator generator field winding in order to slow down the elevator car as the car approaches a stopping point, and means effective when the elevator car reaches during slow-down a point intermediate the slow-down and stopping points for decreasing the excitation supplied by the first regulator generator field winding and for increasing the excitation supplied by the second and third regulator generator field windings.

19. In an elevator system, an elevator car, driving means including a direct-current motor having an armature for driving the elevator car, a direct-current main generator for supplying electrical energy to the motor, said generator having a main generator armature and a main generator field winding, a direct-current regulator generator having a regulator generator armature and first, second and third regulator generator field windings, a loop circuit connecting the main generator armature and the motor armature in series, connections for energizing the main generator field winding in accordance with the output of the regulator generator armature, connections for energizing the first regulator generator field winding substantially in accordance with a predetermined adjustable voltage having a predetermined polarity, means for energizing the second regulator generator field winding substantially in accordance with the armature voltage of the motor with proper polarity to provide excitation acting in opposition to the excitation supplied by the first regulator generator field winding, means for energizing the third regulator generator field winding substantially in accordance with current supplied to the motor armature with proper polarity to produce an excitation aiding the excitation supplied by the first regulator generator field winding to compensate substantially for voltage drops due to resistance in the motor armature, means responsive to arrival of the elevator car at a slow-down point in its travel at which the car is to slow down for decreasing the energization of the first and third regulator generator field windings in order to slow down the elevator car as the car approaches a stopping point, and means effective when the elevator car reaches during slow-down a point intermediate the slow-down and stopping points for decreasing the excitation supplied by the first regulator generator field winding and for increasing the excitation supplied by the second and third regulator generator field windings.

20. In an elevator system, an elevator car, driving means including a direct-current motor having an armature for driving the elevator car, a direct-current main generator for supplying electrical energy to the motor, said generator having a main generator armature and a main generator field winding, a direct-current regulator generator having a regulator generator armature and first, second, third and fourth regulator generator field windings, a loop circuit connecting the main generator armature and the motor armature in series, connections for energizing the main generator field winding in accordance with the output of the regulator generator armature, connections for energizing the first regulator generator field winding substantially in accordance with a predetermined adjustable voltage having a predetermined polarity, means for energizing the second regulator generator field winding substantially in accordance with the armature voltage of the motor with proper polarity to provide excitation acting in opposition to the excitation supplied by the first regulator generator field winding, means for energizing the third regulator generator field winding substantially in accordance with current supplied to the motor armature with proper polarity to produce an excitation aiding the excitation supplied by the first regulator generator field winding to compensate substantially for voltage drops due to resistance in the motor armature, said fourth regulator generator field winding being connected for energization in accordance with current supplied to the main generator field winding and being so proportioned that the excitation from this fourth generator field winding compensates for the resistance drop in the circuit through which the main generator field winding is energized, means responsive to arrival of the elevator car at a slow-down point in its travel at which the car is to slow down for decreasing the energization of the first regulator generator field winding in order to slow down the elevator car as the car approaches a stopping point, and means effective when the elevator car reaches during slow-down a point intermediate the slow-down and stopping points for decreasing the excitation supplied by the first regulator generator field winding and for increasing the excitation supplied by the second regulator generator field winding.

21. In an elevator system, an elevator car, driving means including a direct-current motor having an armature for driving the elevator car, a direct-current main generator for supplying electrical energy to the motor, said generator having a main generator armature and a main generator field winding, a direct-current regulator generator having a regulator generator armature and first, second, third and fourth regulator generator field windings, a loop circuit connecting the main generator armature and the motor armature in series, connections for energizing the main generator field winding in accordance with the output of the regulator generator armature, connections for energizing the first regulator generator field winding substantially in accordance with a predetermined adjustable voltage having a predetermined polarity, means for energizing the second regulator generator field winding substantially in accordance with the armature voltage of the motor with proper polarity to provide excitation acting in opposition to the excitation supplied by the first regulator generator field winding, means for energizing the third regulator generator field winding substantially in accordance with current supplied to the motor armature with proper polarity to produce an excitation aiding the excitation supplied by the first regulator generator field winding to compensate substantially for voltage drops due to resistance in the motor armature, said fourth regulator generator field winding being connected for energization in accordance with current supplied to the main generator field winding and being so proportioned that the excitation from this fourth generator field winding compensates for the resistance drop in the circuit through which the main generator field winding is energized, means responsive to arrival of the elevator car at a slow-down point in its travel at which the car is to slow down for decreasing the energization of the first regulator generator field winding in order to slow down the elevator car as the car approaches a stopping point, and means effective when the elevator car reaches during slow-down a point intermediate the slow-down and stopping points for decreasing the excitation supplied by the first regulator generator field winding and for increasing the excitation supplied by the second and third regulator generator field windings.

22. In an elevator system, an elevator car, driving means including a direct-current motor having an armature for driving the elevator car, a direct-current main generator for supplying electrical energy to the motor, said generator having a main generator armature and a main generator field winding, a direct-current regulator generator having a regulator generator armature and first, second, third and fourth regulator generator field windings, a loop circuit connecting the main generator armature and the motor armature in series, connections for energizing the main generator field winding in accordance with the output of the regulator generator armature, connections for energizing the first regulator generator field winding substantially in accordance with a predetermined adjustable voltage having a predetermined polarity, means for energizing the second regulator generator field winding substantially in accordance with the armature voltage of the motor with proper polarity to provide excitation acting in opposition to the excitation supplied by the first regulator generator field winding, means for energizing the third regulator generator field winding substantially in accordance with current supplied to the motor armature with proper polarity to produce an excitation aiding the excitation supplied by the first regulator generator field winding proportioned to compensate substantially for voltage drops due to resistance in the motor armature, said fourth regulator generator field winding being connected for energization in accordance with current supplied to the main generator field winding and being so proportioned that the excitation from this fourth generator field winding compensates for the resistance drop in the circuit through which the main generator field winding is energized, means responsive to arrival of the elevator car at a slow-down point in its travel at which the car is to slow down for decreasing the energization of the first and third regulator generator field windings in order to slow down the elevator car as the car approaches a stopping point, and means effective when the elevator car reaches during slow-down a point intermediate the slow-down and stopping points for decerasing the excitation supplied by the first regulator generator field winding and for increasing the excitation supplied by the first and third regulator generator field windings.

PHILLIP C. KEIPER.
WILLIAM M. OSTRANDER.

No references cited.